(12) United States Patent
Zhang et al.

(10) Patent No.: US 8,660,594 B2
(45) Date of Patent: Feb. 25, 2014

(54) METHOD AND DATA CARD FOR SHIELDING SHORT MESSAGE RECEIVING FUNCTION

(75) Inventors: Yi Zhang, Shenzhen (CN); Gang Xue, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 109 days.

(21) Appl. No.: 13/520,804

(22) PCT Filed: Sep. 25, 2010

(86) PCT No.: PCT/CN2010/077287
§ 371 (c)(1),
(2), (4) Date: Jul. 6, 2012

(87) PCT Pub. No.: WO2011/091669
PCT Pub. Date: Aug. 4, 2011

(65) Prior Publication Data
US 2013/0059612 A1    Mar. 7, 2013

(30) Foreign Application Priority Data

Jan. 28, 2010 (CN) .......................... 2010 1 0104526

(51) Int. Cl.
*H04W 4/00* (2009.01)
(52) U.S. Cl.
USPC ........................................ 455/466; 455/414.1
(58) Field of Classification Search
USPC ............................................... 455/414.1, 466
See application file for complete search history.

(56) References Cited

U.S. PATENT DOCUMENTS

| 7,200,384 B1 * | 4/2007 | Tervo et al. ................ 455/414.1 |
| 2006/0172734 A1 | 8/2006 | Tak |
| 2011/0159843 A1 * | 6/2011 | Heath et al. .................. 455/411 |

FOREIGN PATENT DOCUMENTS

| CN | 1561125 A | 1/2005 |
| CN | 1972334 A | 5/2007 |
| CN | 101018251 A | 8/2007 |
| CN | 101242559 A | 8/2008 |
| CN | 101820599 A | 9/2010 |

(Continued)

OTHER PUBLICATIONS

International Search Report in international application No. PCT/CN2010/077287, mailed on Dec. 30, 2010.
English Translation of the Written Opinion of the International Search Authority in international application No. PCT/CN2010/077287, mailed on Dec. 30, 2010.
International Search Report in international patent application No. PCT/CN2010/077287, dated Dec. 30, 2010, filed in U.S. Appl. No. 13/520,804 on Sep. 19, 2012.
Written Opinion in international patent application No. PCT/CN2010/077287, dated Dec. 30, 2010, filed in U.S. Appl. No. 13/520,804 on Sep. 19, 2012.

*Primary Examiner* — Charles Appiah
*Assistant Examiner* — Jaime Holliday
(74) *Attorney, Agent, or Firm* — Oppedahl Patent Law Firm LLC

(57) ABSTRACT

The disclosure discloses a method for shielding a short message receiving function. The method includes the following steps of: storing parameters related to short-message-receiving-function-shielding in an Element File (EF) in a Subscriber Identity Model (SIM) card; performing inter-verification by utilizing the EF in the SIM-card and a Non Volatile (NV) random access memory in a data card to determine whether the SIM-card is applied to the data card; and when the SIM-card is determined to be applied to the data card, reporting the parameters related to short-message-receiving-function-shielding to a network during the process of attaching mobile terminal to the network. Compared with the conventional art, the technical solution of the disclosure can shield the short message receiving function without generating short message fee, so as to enhance the stability of the data service to a large extent and increase the flexibility for a subscriber in selecting the service type at the terminal.

12 Claims, 4 Drawing Sheets

(56) References Cited

FOREIGN PATENT DOCUMENTS

| | | |
|---|---|---|
| JP | 2002368871 A | 12/2002 |
| JP | 2006157913 A | 6/2006 |
| JP | 2008017440 A | 1/2008 |
| JP | 2008507861 A | 3/2008 |
| WO | 2008040120 A1 | 4/2008 |
| WO | 2008085329 A1 | 7/2008 |
| WO | 2008091685 A1 | 7/2008 |

* cited by examiner

| parameter written situation S201 | CS domain short message parameter S202 | PS domain short message parameter S203 |

| CS domain short message parameter S301 | PS domain short message parameter S302 |

METHOD AND DATA CARD FOR SHIELDING SHORT MESSAGE RECEIVING FUNCTION

TECHNICAL FIELD

The disclosure relates to a technology for shielding short message reception, in particular to a method and a data card for shielding a short message receiving function.

BACKGROUND

With development maturity and commercial popularization of a 3rd Generation (3G) technology, the competition among operators becomes increasingly intense. The sale of data card terminal equipment is made more and more according to customization requirements from operators, wherein a short message service is a necessary and very important customization demand. Moreover, various different short message customization demands become a general trend of terminal software functions required by numerous operators.

An existing mobile communication network has data service, short message service, voice service and the like, but does not support concurrency of these services well; and when two or more services are performed at the same time, the real-time, the continuity and the stability of the services cannot ensured at the same time, and losses of different degrees in each aspect are caused, because some services are born in a circuit switch domain and some services are born in a packet switch domain.

The positioning of a data card mainly aims at data service at present, namely common web page browsing, data downloading and the like. Most data card subscribers use a Subscriber Identity Model (SIM) card alternately in a mobile phone and a data card; and when a subscriber places an SIM-card on a data card to use, more attention is paid to data service, because it is far more convenient to perform data operation on a mobile phone terminal than on a Personal Computer (PC), but it is not the same case for short message service. Therefore, a short message receiving function can be shielded on a data card terminal according to the demand of a subscriber to enhance the stability of the data service at a large extent and increase the flexibility for the subscriber in selecting service types at a terminal. Moreover, the subscriber can close a short message receiving function in real time on a data card terminal capable of shielding the short message receiving function automatically while the subscriber pays close attention to data service quality, and no short message fee is brought to a short message sending party; and when the SIM-card of the subscriber is used on a mobile terminal, the short message receiving function is not influenced, so that the subscriber can configure a short message function in real time according to a current network environment and function requirements.

SUMMARY

The disclosure aims to provide a method and a data card for shielding a short message receiving function.

In order to fulfill the aim, the disclosure provides a method for shielding a short message receiving function. The method includes: storing parameters related to short-message-receiving-function-shielding into an Element File (EF) of a Subscriber Identity Model (SIM) card; reporting the parameters related to short-message-receiving-function-shielding to a network during network attachment carried out by a data card terminal, when, by utilizing inter-verification between the EF in the SIM card and a file of a Non Volatile Random Access Memory (NV) in a data card, determining that the SIM-card is applied to the data card.

Further, after the data card is electrified and during an SIM-card initialization, a firmware program may read the EF which stores the parameters related to short-message-receiving-function-shielding from the SIM-card, and store the parameters related to short-message-receiving-function shielding.

Further, after the initialization is finished, the data card terminal may carry out the network attachment, and report the parameters related to short-message-receiving-function-shielding to the network during the network attachment; after receiving the parameters related to short-message-receiving-function-shielding, the network may shield the short message receiving function of the SIM-card in a Circuit Switch (CS) domain and a Packet Switch (PS) domain, and return an error parameter indicative of failure to a short message sending party according to a protocol when a Mobile Terminated Short Message Service (MT SMS) aiming at the subscriber exists.

Further, the parameters which are stored in the EF of the SIM-card and represent a short message receiving capability may comprise three parts, namely a parameter written situation part, a CS domain short message parameter part or a PS domain short message parameter part.

Further, the parameter written situation part may indicate whether the SIM-card is used for the first time in the data card terminal which shields the short message receiving function; when the SIM-card is used for the first time, the parameter written situation part may be not configured to be valid, namely the field may be written with nothing; and the firmware program of the data card may write a group of new parameters indicative of short message shielding into the EF of the SIM-card, write parameters related to short-message-receiving-function shielding which are stored in the NV of the data card into a newly-created EF, and configure an identifier of the part to be valid.

Further, the CS domain short message parameter part may indicate a support capability of the data card terminal for receiving a short message born in the CS domain, wherein a parameter in this part is configured to be invalid when the short message receiving function is shielded.

Further, the PS domain short message parameter part may indicate a support capability of the data card terminal for receiving a short message born in the PS domain, wherein a parameter in this part is configured to be invalid when the short message receiving function is shielded.

Further, the NV is configured to store parameters related to short-message-function shielding in the CS domain and the PS domain, wherein the parameters comprise a CS domain short message parameter and a PS domain short message parameter.

Further, the CS domain short message parameter may indicate a support capability of the data card terminal for receiving a short message born in the CS domain and may be configured to be invalid; and the PS domain short message parameter may indicate a support capability of the data card terminal for receiving a short message born in the PS domain and may be configured to be invalid.

Further, the firmware program of the data card may read an EF for storing parameters related to short-message-receiving-function-shielding from the SIM-card and judges whether the parameters are written into the EF; when the parameters are written into the EF, the firmware program of the data card may read the parameters from the EF; and when the parameters are not written into the EF, the firmware program of the data card may create an EF, read parameters related to short-message-receiving-function-shielding from the NV of the data card, and write the parameters related to short-message-receiving-function-shielding in the NV into the newly created EF.

Further, after the SIM-card initialization is finished and during the network attachment, the data card terminal reports the parameters related to short-message-receiving-function-shielding to the network, this step may specifically include: the data card terminal interacts with the network and carries out authentication after the SIM-card initialization is finished; the data card terminal starts the network attachment after finishing the authentication, reads the parameters related to short-message-receiving-function-shielding, and reports the parameters related to short-message-receiving-function-shielding to the network during the network attachment; and the network makes corresponding configuration according to the parameters related to short-message-receiving-function-shielding reported by the data cad terminal.

Further, when an MT SMS aiming at the subscriber exists, the step of returning an error parameter indicative of failure to a short message sending party according to a protocol may specifically include: any other mobile terminal sends a short message to a receiving party; the network receives short message data submitted by the sending party; the network analyzes a number of the receiving party and initiates paging; the network judges whether the receiving party supports the short message receiving function; if the receiving party supports the short message receiving function, the short message is delivered to a short message center and then sent to the receiving party through an air interface; and if the receiving party does not support the short message receiving function, the sending flow is terminated and an error reason is returned to the sending party.

In order to fulfill the aim, the disclosure also provides a data card. The data card includes a Wireless Message Service (WMS), an SIM-card read-write module, an NV file control module and a network searching module, wherein the WMS module is configured to initiate an SIM-card initialization process, read and write an Element File (EF) in an SIM-card, and read and write an NV file;

the SIM-card read-write module is configured to execute reading and writing operations on the SIM card which are initiated by the WMS module;

the NV file control module is configured to execute reading and writing operations on the NV file which are initiated by the WMS module, and return parameters related to short-message-receiving-function-shielding to the WMS module; and the network searching module is configured to report parameters related to short-message-receiving-function-shielding to the network during a network attachment process after acquiring the parameters related to short-message-receiving-function-shielding sent by the SIM-card module.

Further, the WMS module may first finish the SIM-card initialization process, then reads an EF, used for storing parameters related to short-message-receiving-function-shielding, from the SIM-card and reads the NV file in the data card when the EF is not written with the parameters, and finally writes parameters related to the short-message-receiving-function-shielding in the NV file into the EF of the SIM-card.

In summary, compared with the existing technology, the technical scheme provided by the present disclosure can shield the short message receiving function without generating short message fee, thereby enhancing the stability of a data service to a large extent and increasing the flexibility for a subscriber in selecting a service type at the terminal.

DETAILED DESCRIPTION

Figures 1, 2, 3:
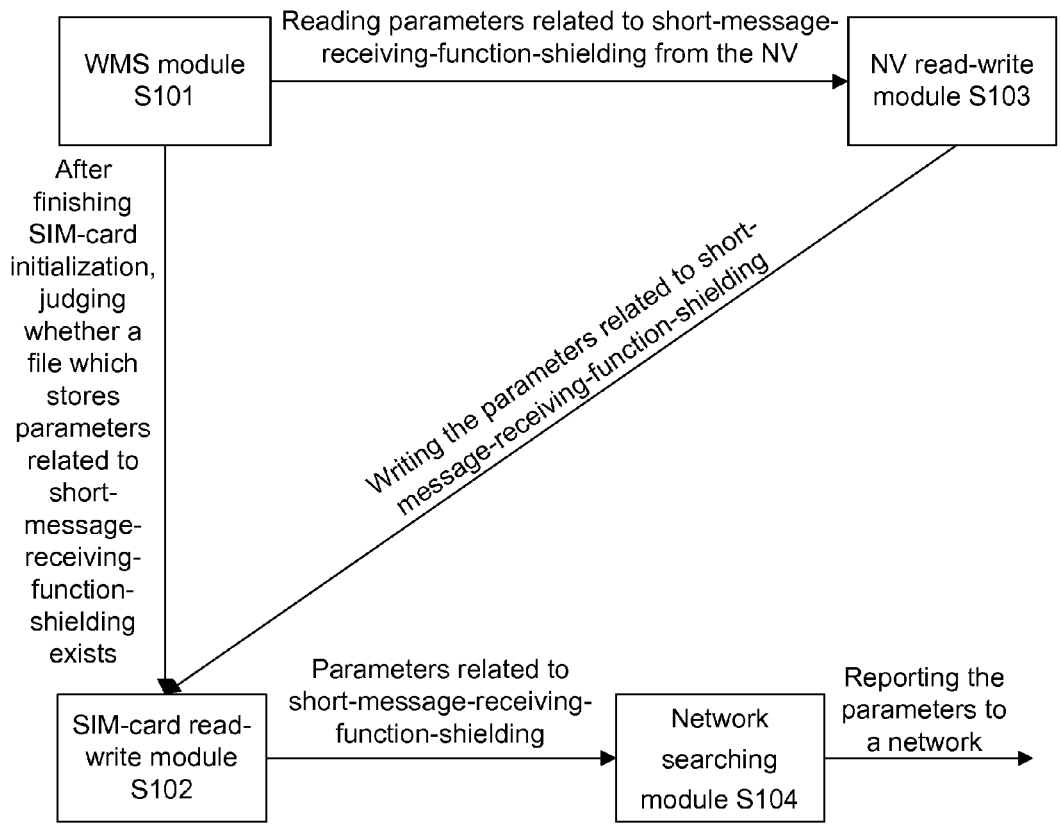
FIG. 1 is a schematic diagram of modules of a data card according to an embodiment of the present disclosure.
FIG. 2 is a storage structure of parameters related to short-message-receiving-function-shielding in an EF of an SIM-card.
FIG. 3 is a storage structure of parameters related to short-message-receiving-function-shielding in an NV file of an SIM-card.

The main idea of the technical scheme in the present disclosure is to provide a method for determining that an SIM-card is used on a data card and automatically shielding a short message receiving function eventually by utilizing inter-verification between an Element File (EF) in the SIM-card and a Non Volatile Random Access Memory (NV) in the data card.

The present disclosure discloses a technical scheme for shielding a short message receiving function without causing fee to a sending party by performing inter-verification between an EF in an SIM card and an NV file in a data card, reporting a Mobile Terminated Short Message Service (MT SMS) message which indicates that a Circuit Switched Domain (CS domain) and a Packet Switched Domain (PS domain) are not supported to a network during a network attachment process carried out by a data card terminal. The technical scheme involves three parties, namely a data card terminal, an operator network and an SIM card.

The Short Message Service (SMS) is a very important value-added service of operators. The short message receiving function of a common SIM-card subscriber is in an open state; according to a 3 Gpp protocol, a mobile terminal notifies a network through a series of signalling interaction with the network after the mobile terminal is powered on, and reports a group of parameters indicative of the capability of the subscriber of supporting short messages in different bearing domains.

In the technical scheme of the disclosure, a dedicated location in an EF field of the SIM card is used for recording the capability of an SIM-card subscriber of supporting various services. After being electrified, the mobile terminal enters authentication and network attachment processes; in the processes, a firmware program of the mobile terminal reads parameters in a related EF in the SIM card, and reports information of the capability of the mobile terminal of supporting various services to the network; and a database of the operator network establishes a corresponding function relationship with an International Mobile Subscriber Identifier (IMSI) of each SIM subscriber according to the parameters.

Two functions are needed to be achieved by the data card terminal: firstly, whether the SIM card is used on the data card terminal for the first time is determined in the SIM-card initialization process; if it is used for the first time, a new EF is created and short message parameters in an NV are written into the EF, otherwise, parameters in the EF are read out by the firmware program; secondly, in the network attachment process carried out by the mobile terminal, the firmware program reports short message receiving parameters in the EF to the network, and the network stores short message support information of the IMSI subscriber according to the reported parameters so that the network can refuse a short message when a subscriber sends the short message to the SIM-card subscriber, therefore, the short message sent by the subscriber cannot be delivered to a short message center successfully, thus avoiding the charge on the short message.

The two functions above are realized by the following processes:

1. after the data card is electrified and in the SIM-card initialization process, the firmware program reads an EF for storing parameters related to short-message-receiving-function-shielding from the SIM-card, and stores the parameters in the EF in codes; and 2. after the initialization is finished, the data card terminal carries out network attachment, and the parameters related to short-message-receiving-function-shielding are reported to the network in the network attachment process; after acquiring the group of the parameters, the operator network automatically shields the SIM-card subscriber from the short message receiving function in the CS domain and the PS domain, and returns an error parameter indicative of failure to the short message sending party according to a protocol when an MT SMS aiming at the subscriber exists.

The technical scheme of the present disclosure is described below with reference to the accompanying drawings and embodiments.

FIG. 1 is a schematic diagram of modules of a data card according to an embodiment. In the embodiment, the data card comprises a Wireless Message Service (WMS) module S101, an SIM-card read-write module S102, an NV file control module S103 and a network searching module S104.

The function of the WMS module S101 comprise: initiating an SIM-card initialization process, reading and writing an EF in an SIM-card, and reading and writing an NV file, and the like; the WMS module S101 finishes an SIM-card initialization process first, and then reads an EF for storing parameters related to short-message-receiving-function-shielding from an SIM-card, if the parameters are not written into the EF, then the WMS module S101 turns to read an NV file in the data card, and writes parameters related to short-message-receiving-function-shielding in the NV file into the EF of the SIM-card.

The function of the SIM-card read-write module S102 is to execute reading and writing operations on the SIM-card initiated by the WMS module.

The NV file control module S103 mainly executes reading and writing operations on the NV file initiated by the WMS module, and returns parameters to the WMS module.

The network searching module 104 reports parameters related to short-message-receiving-function-shielding to a network during a network attaching process after acquiring the parameters from the SIM-card module.

FIG. 2 is a storage structure of parameters related to short-message-receiving-function-shielding in an EF of an SIM-card. In the embodiment, parameters which are stored in an EF of the SIM-card and represent a short message receiving capability comprise three parts, namely a parameter written situation part S201, a CS domain short message parameter part S202 and a PS domain short message parameter part S203.

The parameter written situation part S201 indicates whether the SIM-card is used for the first time in the data card terminal which shields the short message receiving function; when the SIM-card is used for the first time, this part is not configured to be valid, and the value of the part is 0xFF at the moment, namely nothing is written into the field; and the firmware program of the data card writes a group of new short message shielding parameters into the EF of the SIM-card, writes parameters related to short-message-receiving-function-shielding stored in the NV of the data card into a newly-created EF, and configures the identifier of this part as 0x01.

The CS domain short message parameter part S202 indicates the support capability of a terminal of receiving short messages born in the CS domain. In the method of the present disclosure, since the function of shielding short message reception is opened, a parameter in this part is configured as 0x00.

The PS domain short message parameter part S203 indicates the support capability of a terminal of receiving short messages born in the PS domain. Since the function of shielding short message reception is opened, a parameter in the part is configured as 0x00.

FIG. 3 is a storage structure of parameters related to short-message-receiving-function-shielding in an NV file of an SIM-card. In an embodiment of the present disclosure, in order to shield the short message receiving function, an NV item for holding the function of shielding short message reception is extended in a data card; the NV item is configured to store parameters related to shielding of short message functions in the CS domain and the PS domain, wherein the parameters comprise two parts, namely a CS domain short message parameter part S301 and a PS domain short message parameter part S302.

The CS domain short message parameter part S301 indicates the support capability of a terminal for receiving a short message born in the CS domain; and in the method of the present disclosure, the parameter in this part is configured as 0x00.

The PS domain short message parameter part S302 indicates the support capability of a terminal for receiving a short message born in the PS domain; and in the method of the disclosure, the parameter in this part is configured as 0x00.

Figure 4:
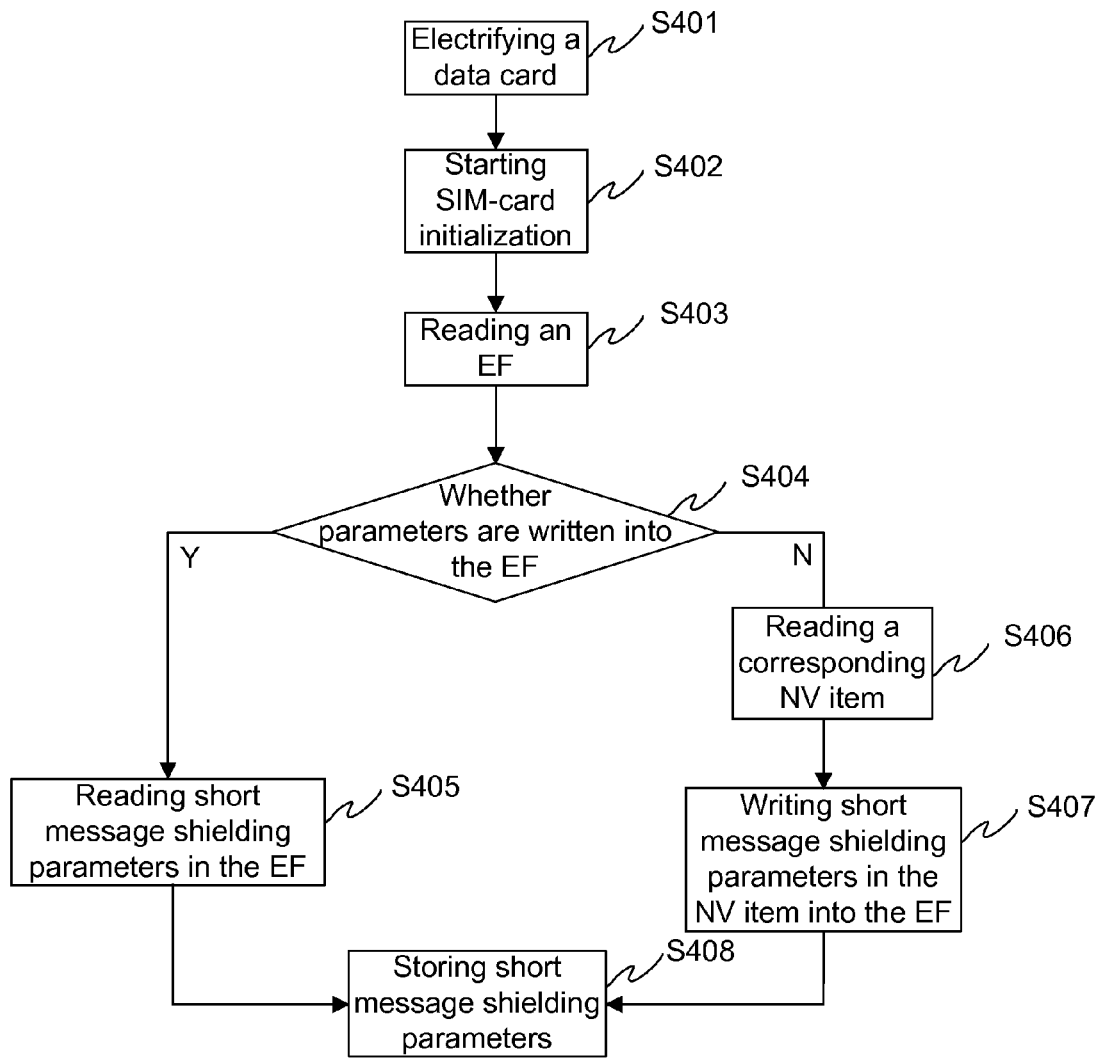
FIG. 4 is a process of determining whether an EF exists in an SIM-card, reading, writing and storing parameters related to short-message-receiving-function-shielding during an SIM initialization process after a data card terminal is electrified.

FIG. 4 is a schematic diagram of a process of determining whether an EF exists in an SIM-card, and reading, writing and storing parameters related to short-message-receiving-function-shielding in an SIM initialization process after a data card terminal is electrified. A data card enters an SIM-card initialization process after being electrified, and queries, reads and writes a file in the SIM-card in this process; the specific process is as follows:

step S401: electrifying the data card;

specifically, inserting the SIM-card into the data card, and electrifying the data card after connecting the data card to a Universal Serial Bus (USB) port of a PC;

step S402: starting to initialize the SIM-card;

that is, entering an SIM-card initialization process after the data card becomes online and the working mode is set as online;

step S403: reading an EF;

specifically, the firmware program of the data card attempts to read an EF used for storing parameters related to short-message-receiving-function-shielding from the SIM-card;

step S404: judging whether parameters are written into the EF;

specifically, judging whether parameters are written into the EF according to the reading result in step 403, if parameters are written into the EF, turning to step 405; otherwise, turning to step 406;

step S405: reading short message parameters in the EF;

specifically, when the EF exists, directly reading the parameters related to short-message-receiving-function-shielding in the EF and storing the parameters;

step S406: reading a corresponding NV item;

specifically, when the EF does not exist, creating an EF and reading parameters from the NV of the data card;

step S407: writing short message shielding parameters in the NV into the EF;

specifically, writing the parameter values in the NV into the newly created EF; and step S408: storing the short message shielding parameters.

Figure 5:
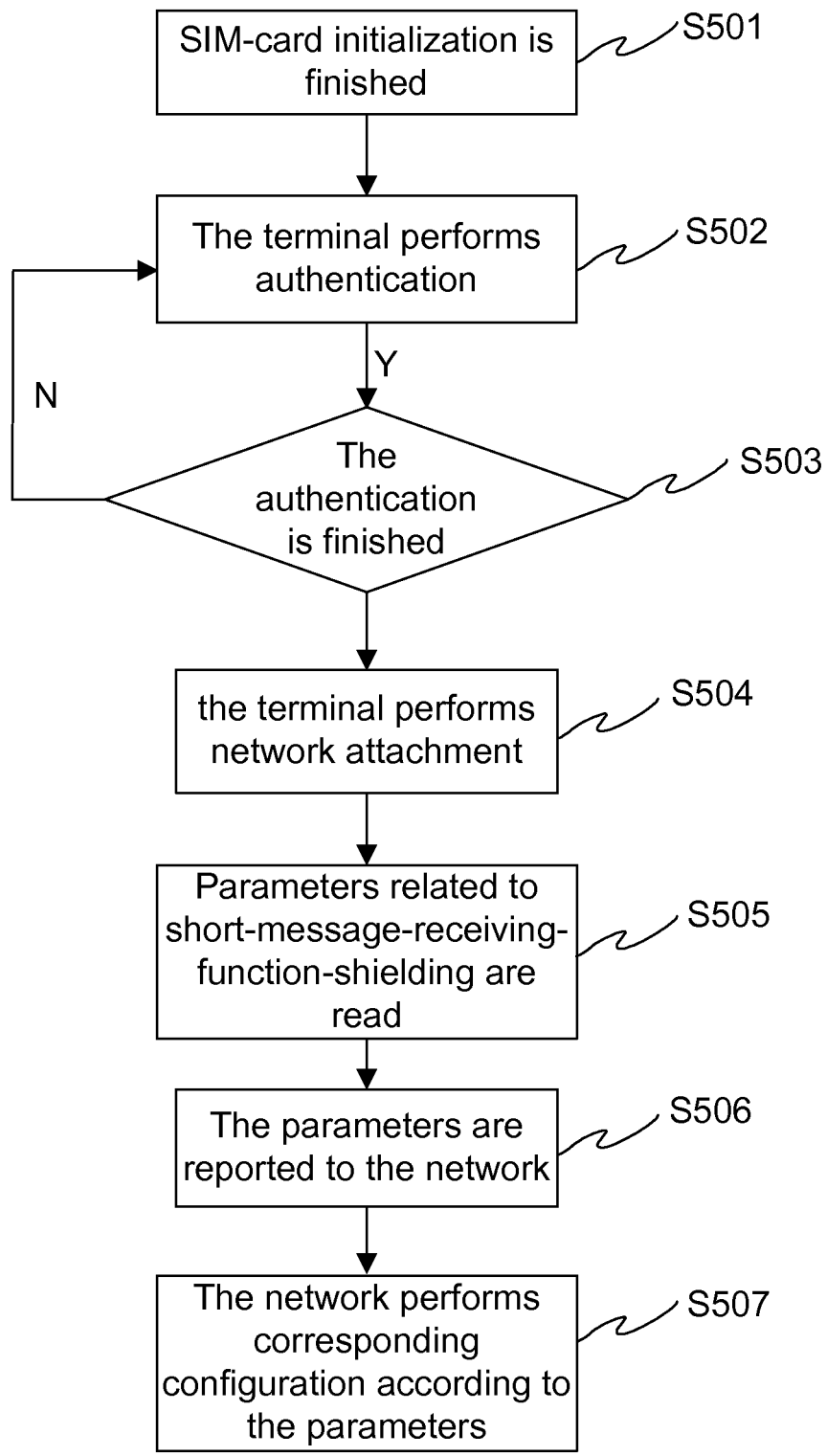
FIG. 5 is a process of a data card terminal reading parameters related to short-message-receiving-function-shielding and reporting the parameters to a network during a network attachment signalling flow after SIM-card initialization is finished.

FIG. 5 is a process of a data card terminal reading parameters related to short-message-receiving-function-shielding and reporting the parameters to a network in a network-attachment signalling process after SIM-card initialization is finished; specifically, step S501: finishing SIM-card initialization;

step S502: carrying out interaction between the terminal and the network, and starting authentication;

step S503: judging whether the authentication is finished; if it is finished, turning to step S504, otherwise, turning to step S502;

step S504: starting network attachment after the authentication is finished;

step S505: reading parameters related to short-message-receiving-function-shielding;

specifically, the firmware program of the data card reads the parameters related to short-message-receiving-function-shielding stored in FIG. 3;

step S506: reporting the parameters to the network;

specifically, reporting parameters of the capability of the terminal supporting the MT SMS of each bearing domain to the network during the network attachment process; and step S507: making corresponding configuration after the network receives the parameters reported by the terminal.

Figure 6:
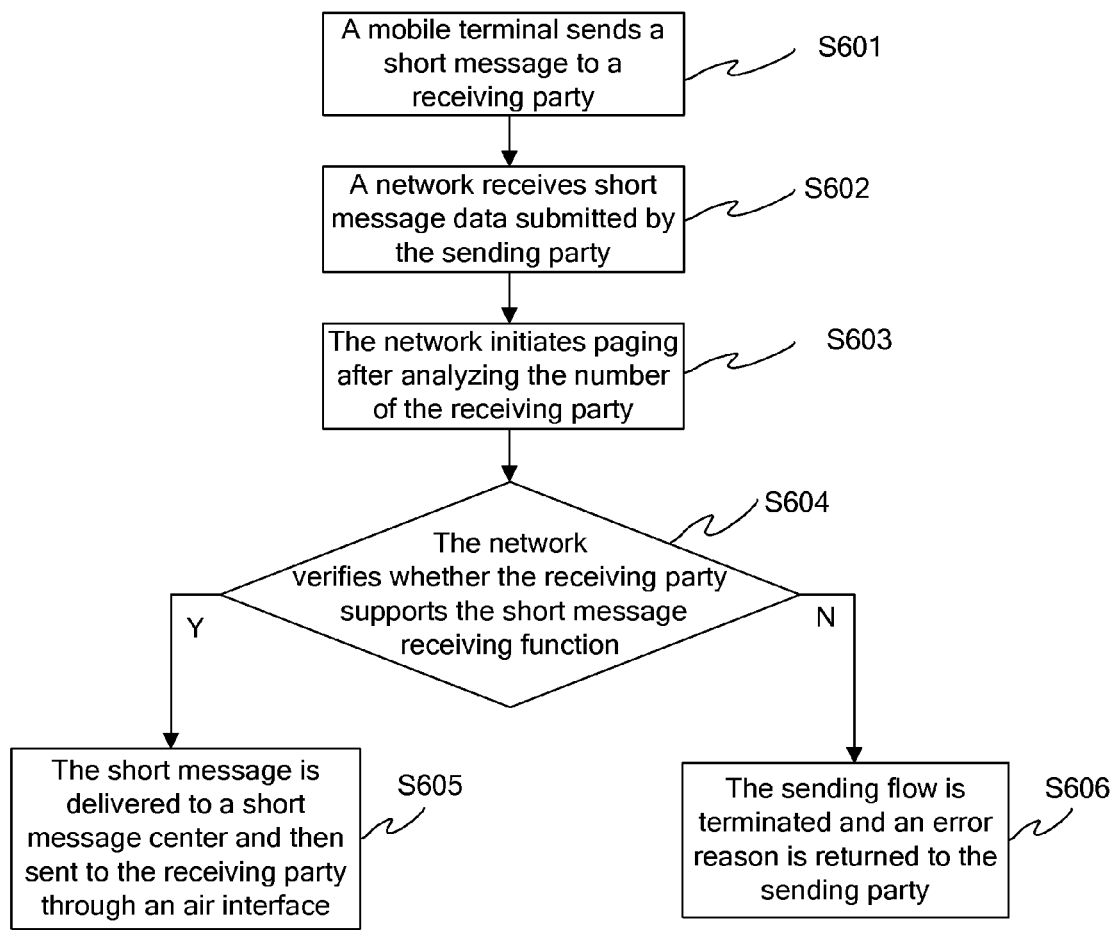
FIG. 6 is a flow of signalling interaction between a mobile terminal and a network when the mobile terminal sends a short message to a data card terminal which shields a short message receiving function.

FIG. 6 is a flow of signalling interaction between a mobile terminal and a network when the mobile terminal sends a short message to a data card terminal which shields the short message receiving function, comprising the following steps:

step S601: the mobile terminal sends a short message to a receiving party;

step S602: the network receives short message data submitted by the sending party;

step S603: the network analyzes the number of the receiving party and initiates paging;

step S604: the network judges whether the receiving party supports the short message receiving function; if it supports the function, step S605 is executed; otherwise, step S606 is executed;

step S605: the short message is delivered to a short message center, and then sent to the receiving party through an air interface;

if the subscriber supports the short message function normally, then the network continues to send a short message to the short message center; then the short message center delivers the short message to the receiving party and generates a short message fee; and step S606: the sending flow is terminated and an error reason is returned to the sending party.

If the subscriber has made an operation to shield the short messages in the CS domain and the PS domain, then the network does not continue the following sending flow and directly returns the error reason to the sending party which sent the short messages.

By the technical scheme of the disclosure, the short message receiving function can be shielded according to the requirement of the subscriber without generating a short message fee, thereby enhancing the stability of a data service to a large extent and increasing the flexibility for a subscriber in selecting a service type at a terminal.

Certainly, the present disclosure has various implementation modes; the persons skilled in the field can make various corresponding modifications or alternations according to the present disclosure; and the modifications, equivalent replacements and improvements within the spirit and principle of the disclosure shall fall within the scope of protection of the disclosure.

The invention claimed is:

1. A method for shielding a short message receiving function, comprising:

storing parameters related to short-message-receiving-function-shielding into an Element File (EF) of a Subscriber Identity Model (SIM) card;

reporting the parameters related to short-message-receiving-function-shielding to a network during network attachment carried out by a data card terminal, when, by utilizing inter-verification between the EF in the SIM card and a file of a Non Volatile Random Access Memory (NV) in a data card, determining that the SIM-card is applied to the data card;

wherein after the data card is electrified and during an SIM-card initialization, a firmware program reads the EF which stores the parameters related to short-message-receiving-function-shielding from the SIM-card, and stores the parameters related to short-message-receiving-function shielding;

wherein after the initialization is finished, the data card terminal carries out the network attachment, and reports the parameters related to short-message-receiving-function-shielding to the network during the network attachment; after receiving the parameters related to short-message-receiving-function-shielding, the network shields the short message receiving function of the SIM-card in a Circuit Switch (CS) domain and a Packet Switch (PS) domain, and returns an error parameter indicative of failure to a short message sending party according to a protocol when a Mobile Terminated Short Message Service (MT SMS) aiming at the subscriber exists.

2. The method according to claim 1, wherein the parameters which are stored in the EF of the SIM-card and represent a short message receiving capability comprise three parts, namely a parameter written situation part, a CS domain short message parameter part and a PS domain short message parameter part.

3. The method according to claim 2, wherein the parameter written situation part indicates whether the SIM-card is used for the first time in the data card terminal which shields the short message receiving function; when the SIM-card is used for the first time, the parameter written situation part is not configured to be valid, namely nothing is written into the field; and the firmware program of the data card writes a group of new parameters indicative of short message shielding into the EF of the SIM-card, writes parameters related to short-message-receiving-function shielding which are stored in the NV of the data card into a newly-created EF, and configures an identifier of the part to be valid.

4. The method according to claim 2, wherein the CS domain short message parameter part indicates a support capability of the data card terminal for receiving a short message born in the CS domain, wherein a parameter in this part is configured to be invalid when the short message receiving function is shielded.

5. The method according to claim 2, wherein the PS domain short message parameter part indicates a support capability of the data card terminal for receiving a short message born in the PS domain, wherein a parameter in this part is configured to be invalid when the short message receiving function is shielded.

6. The method according to claim 1, wherein the NV is configured to store parameters related to short-message-function shielding in the CS domain and the PS domain, wherein the parameters comprise a CS domain short message parameter and a PS domain short message parameter.

7. The method according to claim 6, wherein the CS domain short message parameter indicates a support capability of the data card terminal for receiving a short message born in the CS domain and is configured to be invalid; and the PS domain short message parameter indicates a capability of the data card terminal for receiving a short message born in the PS domain and is configured to be invalid.

8. The method according to claim 1, wherein a firmware program of the data card reads an EF for storing parameters related to short-message-receiving-function-shielding from the SIM-card and judges whether the parameters are written into the EF; when the parameters are written into the EF, the firmware program of the data card reads the parameters from the EF; and when the parameters are not written into the EF, the firmware program of the data card creates an EF, reads parameters related to short-message-receiving-function-shielding from the NV of the data card, and writes the parameters related to short-message-receiving-function-shielding in the NV into the newly created EF.

9. The method according to claim 1, wherein the reporting the parameters related to short-message-receiving-function-shielding by the data card terminal to the network after the SIM-card initialization is finished and during the network attachment specifically comprises: the data card terminal interacts with the network and carries out authentication after the SIM-card initialization is finished; the data card terminal starts the network attachment after finishing the authentication, reads the parameters related to short-message-receiving-function-shielding, and reports the parameters related to short-message-receiving-function-shielding to the network during the network attachment; and the network makes corresponding configuration according to the parameters related to short-message-receiving-function-shielding reported by the data card terminal.

10. The method according to claim 1, wherein the returning an error parameter indicative of failure to a short message sending party according to a protocol when an MT SMS aiming at the subscriber exists specifically comprises: any other mobile terminal sends a short message to a receiving party; the network receives short message data submitted by the sending party; the network analyzes a number of the receiving party and initiates paging; the network judges whether the receiving party supports the short message receiving function; if the receiving party supports the short message receiving function, the short message is delivered to a short message center and then sent to the receiving party through an air interface; and if the receiving party does not support the short message receiving function, the sending flow is terminated and an error reason is returned to the sending party.

11. A data card for shielding a short message receiving function, comprising a Wireless Message Service (WMS) module, an Subscriber Identity Model (SIM)-card read-write module, a Non Volatile (NV) file control module and a network searching module, wherein
the WMS module is configured to initiate an SIM-card initialization process, read and write an Element File (EF) in an SIM-card, and read and write an NV file;
the SIM-card read-write module is configured to execute reading and writing operations on the SIM card which are initiated by the WMS module;
the NV file control module is configured to execute reading and writing operations on the NV file which are initiated by the WMS module, and return parameters related to short-message-receiving-function-shielding to the WMS module; and
the network searching module is configured to report parameters related to short-message-receiving-function-shielding to the network during a network attachment process after acquiring the parameters related to short-message-receiving-function-shielding sent by the SIM-card module;
wherein the data card is configured such that during a SIM-card initialization, a firmware program reads the EF which stores the parameters related to short-message-receiving-function-shielding from the SIM-card, and stores the parameters related to short-message-receiving-function shielding;
wherein the data card is configured such that after the initialization is finished, the data card terminal carries out the network attachment, and reports the parameters related to short-message-receiving-function-shielding to the network during the network attachment; after receiving the parameters related to short-message-receiving-function-shielding, the network shields the short message receiving function of the SIM-card in a Circuit Switch (CS) domain and a Packet Switch (PS) domain, and returns an error parameter indicative of failure to a short message sending party according to a protocol when a Mobile Terminated Short Message Service (MT SMS) aiming at the subscriber exists.

12. The data card according to claim 11, wherein the WMS module finishes the SIM-card initialization process first, and then reads an EF for storing parameters related to short-message-receiving-function-shielding from the SIM-card, when the EF is not written with the parameters, then the WMS module reads the NV file in the data card, and writes parameters related to short-message-receiving-function-shielding in the NV file into the EF of the SIM-card.

* * * * *